United States Patent
Ma et al.

(10) Patent No.: US 11,337,217 B2
(45) Date of Patent: *May 17, 2022

(54) METHOD, DEVICE AND SYSTEM FOR CONTROLLING AIR INTERFACE RESOURCE

(71) Applicant: Huawei Technologies Co., Ltd., Shenzhen (CN)

(72) Inventors: Jialiang Ma, Shenzhen (CN); Weilian Jiang, Nanjing (CN); Liang Tang, Shenzhen (CN); Bin Wang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 133 days.

This patent is subject to a terminal disclaimer.

(21) Appl. No.: 16/925,073

(22) Filed: Jul. 9, 2020

(65) Prior Publication Data

US 2020/0383111 A1 Dec. 3, 2020

Related U.S. Application Data

(63) Continuation of application No. 15/380,313, filed on Dec. 15, 2016, now Pat. No. 10,750,499, which is a (Continued)

(30) Foreign Application Priority Data

Jul. 22, 2014 (CN) .......................... 201410348769.2

(51) Int. Cl.
*H04W 72/04* (2009.01)
*H04W 24/08* (2009.01)
(Continued)

(52) U.S. Cl.
CPC ....... *H04W 72/0453* (2013.01); *H04W 24/08* (2013.01); *H04W 72/04* (2013.01);
(Continued)

(58) Field of Classification Search
CPC .... H04L 45/026; H04L 67/145; H04W 24/08; H04W 72/005; H04W 72/04;
(Continued)

(56) References Cited

U.S. PATENT DOCUMENTS 5,828,655 A 10/1998 Moura et al.
RE40,997 E 11/2009 Sunaga
(Continued)

FOREIGN PATENT DOCUMENTS

CN 101465810 A 6/2009
CN 101699912 A 4/2010
(Continued)

OTHER PUBLICATIONS

"3rd Generation Partnership Project; Technical Specification Group Services and System Aspects; Study on S2a Mobility based on GPRS Tunneling Protocol (GTP) and Wireless Local Area Network (WLAN) access to the Enhanced Packet Core (EPC) network (SaMOG); Stage 2 (Release 12)," 3GPP TR 23.852 V12.0.0, XP05071225, pp. 1-157, 3rd Generation Partnership Project, Valbonne, France (Sep. 2013).
(Continued)

*Primary Examiner* — Asad M Nawaz
*Assistant Examiner* — Kai Chang
(74) *Attorney, Agent, or Firm* — Leydig, Voit & Mayer, Ltd.

(57) ABSTRACT

Embodiments of the present application provide a method, device and system for controlling an air interface resource and relates to the field of communications, which improves air interface resource utilization. The method includes: when
(Continued)

a core network device or user equipment detects that service data is not transmitted over a communication channel between the two devices by using an air interface resource, switching a first frequency of sending a hello packet to a peer device to a second frequency, and sending a frequency switching message to instruct the peer device also to switch the first frequency of sending a hello packet to the second frequency, so that when the hello packet is not detected within a packet detection period, an access network device releases an air interface resource occupied by a first communication channel.

22 Claims, 6 Drawing Sheets

Related U.S. Application Data continuation of application No. PCT/CN2015/080437, filed on May 30, 2015.

(51) Int. Cl.
    *H04W 76/23* (2018.01)
    *H04W 76/25* (2018.01)
    *H04W 76/36* (2018.01)
    *H04L 45/02* (2022.01)
    *H04L 67/145* (2022.01)
    *H04W 72/00* (2009.01)

(52) U.S. Cl.
    CPC .......... *H04L 45/026* (2013.01); *H04L 67/145* (2013.01); *H04W 72/005* (2013.01); *H04W 72/044* (2013.01); *H04W 76/23* (2018.02); *H04W 76/25* (2018.02); *H04W 76/36* (2018.02)

(58) Field of Classification Search
    CPC .......... H04W 72/044; H04W 72/0453; H04W 76/23; H04W 76/25; H04W 76/36
    See application file for complete search history.

(56) References Cited

U.S. PATENT DOCUMENTS

| | | | |
|---|---|---|---|
| 9,167,042 B1 | 10/2015 | Ehrhardt et al. | |
| 9,332,547 B1* | 5/2016 | Ghavami | ......... H04W 72/0453 |
| 9,521,559 B2 | 12/2016 | Vermani et al. | |
| 9,655,047 B2 | 5/2017 | Deng et al. | |
| 2004/0136347 A1 | 7/2004 | Fuke et al. | |
| 2006/0111103 A1 | 5/2006 | Jeong et al. | |
| 2007/0115829 A1 | 5/2007 | Strutt et al. | |
| 2007/0135113 A1 | 6/2007 | Moinet et al. | |
| 2008/0089221 A1 | 4/2008 | Bruninghaus et al. | |
| 2008/0186907 A1 | 8/2008 | Yagyuu et al. | |
| 2009/0201857 A1 | 8/2009 | Daudin et al. | |
| 2009/0274058 A1* | 11/2009 | Seto | ............... H04L 67/145 370/252 |
| 2010/0002617 A1 | 1/2010 | Seyama | |
| 2010/0027449 A1 | 2/2010 | Kim et al. | |
| 2010/0165901 A1 | 7/2010 | Kim | |
| 2010/0195701 A1 | 8/2010 | Letunov et al. | |
| 2011/0077019 A1 | 3/2011 | De Pasquale et al. | |
| 2012/0231825 A1 | 9/2012 | Gossain et al. | |
| 2013/0051335 A1 | 2/2013 | Adachi et al. | |
| 2013/0077597 A1 | 3/2013 | Nukala et al. | |
| 2013/0151714 A1 | 6/2013 | Ralph et al. | |
| 2013/0163491 A1 | 6/2013 | Singh et al. | |
| 2013/0258945 A1 | 10/2013 | Tomita et al. | |
| 2013/0308636 A1 | 11/2013 | Bacthu et al. | |
| 2014/0003352 A1 | 1/2014 | Dai et al. | |
| 2014/0119195 A1 | 5/2014 | Tofighbakhsh et al. | |
| 2014/0133292 A1 | 5/2014 | Yamatsu et al. | |
| 2014/0169338 A1 | 6/2014 | Bajko et al. | |
| 2014/0235246 A1 | 8/2014 | Lin et al. | |
| 2014/0269344 A1 | 9/2014 | Mie et al. | |
| 2015/0085655 A1* | 3/2015 | Jackson | ............... H04L 47/25 370/232 |
| 2015/0094014 A1 | 4/2015 | Diamond et al. | |
| 2015/0098392 A1 | 4/2015 | Homchaudhuri et al. | |
| 2015/0139199 A1 | 5/2015 | Pfeifer | |
| 2015/0296387 A1 | 10/2015 | Li et al. | |
| 2015/0327054 A1 | 11/2015 | Callender et al. | |
| 2016/0007247 A1 | 1/2016 | Lee et al. | |
| 2016/0020882 A1 | 1/2016 | Shimezawa et al. | |
| 2016/0183261 A1 | 6/2016 | Koorapaty et al. | |
| 2016/0277520 A1 | 9/2016 | Zhang | |
| 2016/0282448 A1 | 9/2016 | Sen et al. | |
| 2016/0316463 A1 | 10/2016 | Liu et al. | |
| 2017/0099668 A1 | 4/2017 | Ma et al. | |
| 2017/0181090 A1 | 6/2017 | Park et al. | |

FOREIGN PATENT DOCUMENTS

| | | | |
|---|---|---|---|
| CN | 102685768 A | | 9/2012 |
| CN | 103037394 A | | 4/2013 |
| CN | 103379570 A | | 10/2013 |
| CN | 103563439 A | | 2/2014 |
| CN | 104159306 A | | 11/2014 |
| CN | 104010289 B | * | 12/2017 |
| EP | 2088714 A1 | | 8/2009 |
| EP | 2685668 A1 | | 1/2014 |
| WO | 9306674 A1 | | 4/1993 |

OTHER PUBLICATIONS

U.S. Appl. No. 15/380,313, filed Dec. 15, 2016.

* cited by examiner

METHOD, DEVICE AND SYSTEM FOR CONTROLLING AIR INTERFACE RESOURCE

CROSS-REFERENCE TO RELATED APPLICATIONS

This application is a continuation of U.S. patent application Ser. No. 15/380,313, filed on Dec. 15, 2016, which is a continuation of International Application No. PCT/CN2015/080437, filed on May 30, 2015, which claims priority to Chinese Patent Application No. 201410348769.2, filed on Jul. 22, 2014. All of the aforementioned patent applications are hereby incorporated by reference in their entireties.

TECHNICAL FIELD

The present application relates to the field of communications, and in particular, to a method, device and system for controlling an air interface resource.

BACKGROUND

In a wireless communications system, when receiving downlink service data sent by a core network device to user equipment, an access network device allocates an air interface resource for the user equipment, so that the access network device is capable of sending the downlink service data to the user equipment by using the air interface resource. For example, in an LTE (Long Term Evolution) system, the access network device may be a base station, the user equipment may be a mobile phone, and the air interface resource is a high frequency resource for transmitting information between the mobile phone and the base station. A frequency resource that can be used for transmitting information is limited, and therefore saving should be made as much as possible when the access network device allocates the air interface resource to the user equipment.

In the prior art, in order to ensure that a communication channel between user equipment and a core network device is normal and reachable, a hello keep-alive packet is sent between the user equipment and the core network device through an access network device. If a hello packet sent by the user equipment or the core network device is detected within a detection period, the access network device keeps an allocated air interface resource to the user equipment. If the hello packet sent by the user equipment or the core network device is not detected within the detection period, the access network device releases the air interface resource that is allocated to the user equipment, so that another user equipment uses the air interface resource.

However, in a practical application scenario, after acquiring an air interface resource, user equipment may not transmit service data by using the air interface resource for a long time, for example, a user stays a long time at a web page that has been loaded by user equipment. Because the user equipment does not perform any new service activity, the air interface resource is not used for transmitting service data within the period, which causes air interface resource waste.

SUMMARY

The present application provides a method, device and system for controlling an air interface resource, which improves air interface resource utilization, so as to solve a problem of air interface resource waste existing in the prior art.

In order to achieve the foregoing objective, the following technical solutions are employed in the embodiments of the present application:

In a first aspect, a method for controlling an air interface resource is provided, and the method includes:

sending, by a first communication device, a hello packet to a second communication device over a first communication channel at a first frequency after an access network device allocates an air interface resource to the first communication channel, where the first communication channel is a communication channel, which passes through the access network device, between the first communication device and the second communication device, and the first communication device is a core network device or user equipment;

detecting, by the first communication device, whether service data is transmitted over the first communication channel by using the air interface resource;

switching, when it is detected that the service data is not transmitted over the first communication channel by using the air interface resource, the first frequency of sending the hello packet to the second communication device to a second frequency of sending the hello packet to the second communication device, where the second frequency is less than the first frequency; and sending a first frequency switching message to the second communication device, where the first frequency switching message is used for instructing the second communication device to switch the first frequency of sending a hello packet to the first communication device to the second frequency.

In a first possible implementation manner of the first aspect, the detecting, by the first communication device, whether service data is transmitted over the first communication channel by using the air interface resource includes:

detecting traffic of the first communication channel according to a preset traffic detection period; and determining, when the traffic of the first communication channel is not detected within the traffic detection period, that the service data is not transmitted over the first communication channel by using the air interface resource.

With reference to the first possible implementation manner of the first aspect, in a second possible implementation manner, the method further includes:

switching, when the traffic of the first communication channel is detected within the traffic detection period, the second frequency of sending the hello packet to the second communication device to the first frequency; and sending a second frequency switching message to the second communication device, where the second frequency switching message is used for instructing the second communication device to switch the second frequency of sending the hello packet to the first communication device to the first frequency.

With reference to the first aspect or the first possible implementation manner, in a third possible implementation manner, the method further includes:

receiving a frequency switching message sent by the second communication device when the second communication device detects the traffic of the first communication channel and switches the second frequency of sending the hello packet to the first communication device to the first frequency; and switching, according to the frequency switching message, the second frequency of sending the hello packet to the second communication device to the first frequency.

In any possible implementation manner of the first aspect to the third possible implementation manner, in a fourth possible implementation manner, if the first communication device is a core network device and the second communication device is user equipment, the method further includes: sending a channel verification message to the user equipment over the first communication channel when the core network device receives a request message of establishing a second communication channel and determines that the second communication channel conflicts with the first communication channel;

retransmitting, when the core network device fails to receive a channel verification response message sent by the user equipment, the channel verification message to the user equipment over the first communication channel; and instructing, if the core network device fails to receive the channel verification response message sent by the user equipment after retransmitting the channel verification message to the user equipment N times, the access network device to delete the first communication channel, where the N is a natural number.

In a second aspect, a method for controlling an air interface resource is provided, and the method includes: sending, by a second communication device, a hello packet to a first communication device over a first communication channel at a first frequency after an access network device allocates an air interface resource to the first communication channel, where the first communication channel is a communication channel, which passes through the access network device, between the first communication device and the second communication device, and the second communication device is a core network device or user equipment;

receiving a first frequency switching message sent by the first communication device when the first communication device detects that service data is not transmitted over the first communication channel by using the air interface resource and switches the first frequency of sending a hello packet to the second communication device to a second frequency; and switching, according to the first frequency switching message, the first frequency of sending the hello packet to the first communication device to the second frequency, where the first frequency is greater than the second frequency.

In a first possible implementation manner of the second aspect, the method further includes:

receiving, when the first communication device detects traffic of the first communication channel and switches the second frequency of sending the hello packet to the second communication device to the first frequency, a second frequency switching message sent by the first communication device; and switching, according to the second frequency switching message, the second frequency of sending the hello packet to the first communication device to the first frequency.

In a second possible implementation manner of the second aspect, the method further includes:

switching, when traffic of the first communication channel is detected according to a preset traffic detection period, the second frequency of sending the hello packet to the first communication device to the first frequency; and sending a frequency switching message to the first communication device, where the frequency switching message is used for instructing the first communication device to switch the second frequency of sending the hello packet to the second communication device to the first frequency.

In any possible implementation manner of the second aspect to the second possible implementation manner, in a third possible implementation manner, if the first communication device is a core network device and the second communication device is user equipment, the method further includes:

receiving a channel verification message sent by the core network device when the core network device receives a request message of establishing a second communication channel and determines that the second communication channel conflicts with the first communication channel; and sending, according to the channel verification message, a channel verification response message to the core network device, so that the core network device maintains, according to the channel verification response message, the air interface resource occupied by the first communication channel.

In a third aspect, a communication device is provided, and the communication device includes:

a sending unit, configured to send a hello packet to a second communication device over a first communication channel at a first frequency after an access network device allocates an air interface resource to the first communication channel, where the first communication channel is a communication channel, which passes through the access network device, between the communication device and the second communication device, and the communication device is a core network device or user equipment;

a detecting unit, configured to detect whether service data is transmitted over the first communication channel by using the air interface resource; and a processing unit, configured to switch, when the detecting unit detects that the service data is not transmitted over the first communication channel by using the air interface resource, the first frequency at which the sending unit sends the hello packet to the second communication device to a second frequency, where the second frequency is less than the first frequency; where the sending unit is further configured to send a first frequency switching message to the second communication device, where the first frequency switching message is used for instructing the second communication device to switch the first frequency of sending a hello packet to the communication device to the second frequency.

In a first possible implementation manner of the third aspect, the detecting unit is specifically configured to:

detect traffic of the first communication channel according to a preset traffic detection period; and the communication device further includes a determining unit, configured to determine, when the traffic of the first communication channel is not detected by the detecting unit, that the service data is not transmitted over the first communication channel by using the air interface resource.

With reference to the first possible implementation manner of the third aspect, in a second possible implementation manner, the detecting unit is further configured to detect the traffic of the first communication channel within the traffic detection period;

the processing unit is further configured to switch the second frequency of sending the hello packet to the second communication device to the first frequency; and the sending unit is further configured to send a second frequency switching message to the second communication device, where the second frequency switching message is used for instructing the second communication device to switch the second frequency of sending the hello packet to the communication device to the first frequency.

With reference to the third aspect or the first possible implementation manner, in a third possible implementation manner, the communication device further includes a receiving unit, configured to receive a frequency switching message sent by the second communication device when the second communication device detects the traffic of the first communication channel and switches the second frequency of sending the hello packet to the communication device to the first frequency; and the processing unit is further configured to switch, according to the frequency switching message, the second frequency of sending the hello packet to the second communication device to the first frequency.

In any possible implementation manner of the third aspect to the third possible implementation manner, in a fourth possible implementation manner, if the communication device is a core network device and the second communication device is user equipment, the receiving unit of the communication device is configured to receive a request message of establishing a second communication channel;

the determining unit is configured to determine, according to the request message, that the second communication channel conflicts with the first communication channel;

the sending unit is further configured to, send a channel verification message to the user equipment over the first communication channel; and retransmit, when a channel verification response message sent by the user equipment is not received, the channel verification message to the user equipment over the first communication channel; and the processing unit is further configured to delete the first communication channel if the channel verification response message sent by the user equipment is not received after the channel verification response is retransmitted to the user equipment N times, where the N is a natural number.

In a fourth aspect, a communication device is provided, and the communication device includes:

a sending unit, configured to send a hello packet to a first communication device over a first communication channel at a first frequency after an access network device allocates an air interface resource to the first communication channel, where the first communication channel is a communication channel, which passes through the access network device, between the first communication device and the communication device, and the communication device is a core network device or user equipment;

a receiving unit, configured to receive a first frequency switching message sent by the first communication device when the first communication device detects that service data is not transmitted over the first communication channel by using the air interface resource and switches the first frequency of sending a hello packet to the communication device to a second frequency; and a processing unit, configured to switch, according to the first frequency switching message, the first frequency of sending the hello packet to the first communication device to the second frequency, where the first frequency is greater than the second frequency.

In a first possible implementation manner of the fourth aspect, the receiving unit is further configured to receive a second frequency switching message sent by the first communication device when the first communication device detects traffic of the first communication channel and switches the second frequency of sending the hello packet to the communication device to the first frequency; and the processing unit is further configured to switch, according to the second frequency switching message, the second frequency of sending the hello packet to the first communication device to the first frequency.

In a second possible implementation manner of the fourth aspect, the communication device further includes a detecting unit, configured to detect traffic of the first communication channel according to a preset traffic detection period;

the processing unit is further configured to switch the second frequency of sending the hello packet to the first communication device to the first frequency; and the sending unit is further configured to send a frequency switching message to the first communication device, where the frequency switching message is used for instructing the first communication device to switch the second frequency of sending the hello packet to the communication device to the first frequency.

In any possible implementation manner of the fourth aspect to the second possible implementation manner, in a third possible implementation manner, if the first communication device is a core network device and the communication device is user equipment, the receiving unit is further configured to receive a channel verification message sent by the core network device when the core network device receives a request message of establishing a second communication channel and determines that the second communication channel conflicts with the first communication channel; and the sending unit is further configured to send, according to the channel verification message, a channel verification response message to the core network device, so that the core network device maintains, according to the channel verification response message, the air interface resource occupied by the first communication channel.

In a fifth aspect, an air interface resource control system is provided, and the air interface resource control system includes an access network device, and the air interface resource control system further includes a core network device and user equipment, where the user equipment is connected to the access network device, and the access network device is connected to the core network device;

the core network device includes the communication device according to any possible implementation manner of the third aspect to the fourth possible implementation manner, and the user equipment includes the communication device according to any possible implementation manner of the fourth aspect to the third possible implementation manner; or the core network device includes the communication device according to any possible implementation manner of the fourth aspect to the second possible implementation manner, and the user equipment includes the communication device according to any possible implementation manner of the third aspect to the third possible implementation manner.

According to the foregoing solutions, when it is detected that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

BRIEF DESCRIPTION OF DRAWINGS

To illustrate the technical solutions provided in the embodiments of the present application more clearly, a brief introduction on the accompanying drawings will be given below. The accompanying drawings in the description below are merely some of the embodiments of the present application, based on which other drawings may be obtained by those skilled in the art without any inventive efforts.

DESCRIPTION OF EMBODIMENTS

The following clearly describes the technical solutions in the embodiments of the present application with reference to the accompanying drawings in the embodiments of the present application. The described embodiments are merely a part rather than all of the embodiments of the present application. All of other embodiments obtained by persons of ordinary skill in the art based on the embodiments of the present application without any inventive efforts, fall into the protection scope of the present application.

All embodiments below in the present application may be applied to a plurality of wireless communications systems, for example, a GSM (global system for mobile communication), a GPRS (general packet radio service) system and an LTE system, and the like. Corresponding to different wireless communications systems, the access network device may be a BSC (base station controller) in the GSM or GPRS system, or may be an eNodeB (evolved node B) in the LTE system.

Figure 1:
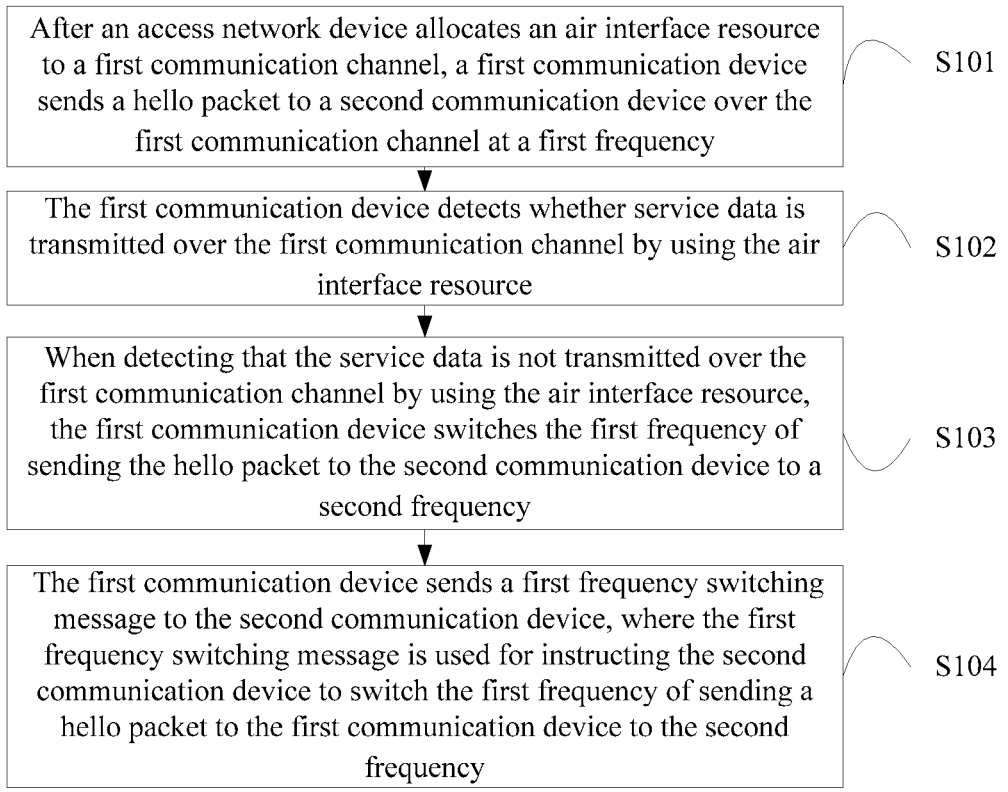
FIG. 1 is a flow diagram of a method for controlling an air interface resource according to an embodiment of the present application.

An embodiment of the present application provides a method for controlling an air interface resource. As shown in FIG. 1, the method includes:

S101. After an access network device allocates an air interface resource to a first communication channel, a first communication device sends a hello packet to a second communication device over the first communication channel at a first frequency.

The first communication channel is a communication channel, which passes through the access network device, between the first communication device and the second communication device. The first communication device is a core network device or user equipment. When the first communication device is a core network device, the second communication device is user equipment; when the first communication device is user equipment, the second communication device is a core network device.

S102. The first communication device detects whether service data is transmitted over the first communication channel by using the air interface resource.

Specifically, the first communication device detects data traffic and/or protocol traffic of the first communication channel according to a preset traffic detection period. When the data traffic and/or protocol traffic of the first communication channel is not detected within the traffic detection period, it is determined that the service data is not transmitted over the first communication channel by using the air interface resource.

Exemplarily, if the first communication device is a core network device and the second communication device is user equipment, the core network device may detect, according to a preset traffic detection period, whether downlink data traffic and/or protocol traffic that is sent to the user equipment over the first communication channel exist/exists. If the downlink data traffic and/or protocol traffic that is sent to the user equipment over the first communication channel do not exist within the preset traffic detection period, then it may be determined that the user equipment does not perform any data service. Therefore, the first communication device may determine that service data is not transmitted over the first communication channel by using the air interface resource. If the first communication device is user equipment and the second communication device is a core network device, the user equipment may detect, according to a preset traffic detection period, whether data traffic and/or protocol traffic, including uplink data traffic and/or protocol traffic, are/is used by the user equipment. When use of the data traffic and/or protocol traffic is not detected within the traffic detection period, it is determined that service data is not transmitted over the first communication channel by using the air interface resource.

S103. When detecting that the service data is not transmitted over the first communication channel by using the air interface resource, the first communication device switches the first frequency of sending the hello packet to the second communication device to a second frequency.

The second frequency is less than the first frequency.

S104. The first communication device sends a first frequency switching message to the second communication device, where the first frequency switching message is used for instructing the second communication device to switch the first frequency of sending a hello packet to the first communication device to the second frequency of sending the hello packet to the first communication device, so that the access network device releases the air interface resource occupied by the first communication channel when the hello packet is not received within a packet detection period.

In a possible implementation manner of the present application, both the core network device and the user equipment may detect whether service data is transmitted over the first communication channel by using the air interface resource. Based on a priority principle, when either device detects that the service data is not transmitted over the first communication channel by using the air interface resource first, the device decreases a frequency at which the device sends the hello packet to the peer device and sends a frequency switching message to instruct the peer device also to decrease a frequency of sending a hello packet.

In addition, the first frequency and the second frequency may be pre-configured by a user. It should be noted that, the first frequency should enable the access network device to receive the hello packet within the packet detection period, and the second frequency should enable the access network device to fail to receive the hello packet within the packet detection period. For example, the packet detection period is 20 s, and the first communication device and the second communication device send one hello packet at the first frequency every 10 s; in this case, the access network device is capable of receiving the hello packet within the packet detection period. If the first communication device and the second communication device send one hello packet at the second frequency every 50 s; in this case, the access network device cannot receive the hello packet within the packet detection period. In this way, because the access network device may release the air interface resource occupied by the first communication channel when the hello packet is not received within the packet detection period, the air interface resource may be occupied by another communication channel that needs to transmit service data, thereby improving air interface resource utilization. That is, the first frequency should be greater than a packet detection frequency, and the second frequency should be less than the packet detection frequency, where the packet detection frequency=1/the packet detection period.

Further, after the access network device releases the air interface resource occupied by the first communication channel, the first communication device switches the second frequency of sending the hello packet to the second communication device to the first frequency when detecting traffic of the first communication channel within the traffic detection period, and sends a second frequency switching message to the second communication device, where the second frequency switching message is used for instructing the second communication device to switch the second frequency of sending the hello packet to the first communication device to the first frequency.

Optionally, after the access network device releases the air interface resource occupied by the first communication channel, the second communication device switches the second frequency of sending the hello packet to the first communication device to the first frequency when traffic (data traffic and/or protocol traffic) of the first communication channel is detected, and sends a frequency switching message to the first communication device. The first communication device switches the second frequency of sending the hello packet to the second communication device to the first frequency according to the frequency switching message.

Specifically, the access network device reallocates an air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource. In this way, when detecting the traffic of the first communication channel, the user equipment or the core network device switches the second frequency at which the user equipment or the core network device sends the hello packet the peer device back to the first frequency, and sends a frequency switching message for instructing the peer device to switch the second frequency of sending the hello packet back to the first frequency, thereby ensuring normal use of the first communication channel.

It should be noted that, this embodiment of the present application may be applied in a scenario of hybrid networking of a DSL (digital subscriber line) and LTE. In this scenario, the core network device is an HAAP (hybrid access aggregation point) server, and the user equipment is an HG (home gateway). The HAAP server is deployed with coordination of an HA (hybrid access) to implement that dual tunnels of a DSL and LTE are bound to each home gateway to provide higher bandwidth for a terminal user of the home gateway. In this way, the home gateway or the HAAP server decreases a frequency of sending a hello packet between the home gateway and the HAAP server when determining that service data is not transmitted over the LTE channel by using an air interface resource, so that an eNodeB in the LTE channel releases the air interface resource occupied by the LTE channel when the hello packet is not detected, and the eNodeB may allocate the air interface resource to another channel, thereby improving air interface resource utilization. If the home gateway and the HAAP server determine that service data or a hello packet is transmitted over the LTE channel by using the air interface resource, that is, when the home gateway or the HAAP server detects data traffic or protocol traffic, a frequency at which both devices send hello packets is restored and normal use of the LTE channel is ensured.

In addition, because an LTE channel and a DSL channel exist between a home gateway and an HAAP server in the scenario of hybrid networking of a DSL and LTE, the home gateway and the HAAP server may send a hello packet to the peer device by using the DSL channel. In this way, after the eNodeB releases the air interface resource occupied by the LTE channel, the hello packet between the home gateway and the HAAP server may still be properly sent. In this case, the home gateway and the HAAP need only to detect data traffic used by the LTE channel, and restore a frequency of sending the hello packets by both the devices when it is determined that service data is transmitted over the LTE channel by using the air interface resource.

Optionally, if the first communication device is a core network device and the second communication device is user equipment, when the core network device receives a request message of establishing a second communication channel, if the second communication channel conflicts with the first communication channel, the core network device sends a channel verification message to the user equipment over the first communication channel. If the core network device fails to receive a channel verification response message sent by the user equipment, the core network device retransmits the channel verification message to the user equipment over the first communication channel, and the first communication channel is deleted if the core network device still fails to receive the channel verification response message sent by the user equipment after the core network device retransmits the channel verification message to the user equipment N times, where the N is a natural number.

It should be noted that, in the prior art, if user equipment is powered off or restarts, a core network device may not perceive the power-off or restarting of the user equipment immediately. In this case, a first communication channel between the user equipment and the core network device may still be maintained until a hello packet expires. In this way, if it is detected that a time after the hello packet expires is too long, waste of the air interface resource occupied by the first communication channel may be caused. And, when the core network device receives a request message of establishing a second communication channel sent by the user equipment or another user equipment, if the second communication channel requested by the request message conflicts with the first communication channel, the second communication channel cannot be established. In this embodiment of the present application, when determining that the second communication channel conflicts with the first communication channel, the core network device sends a channel verification message to the user equipment over the first communication channel to verify whether the first communication channel is normally used. After the core network device retransmits the channel verification message multiple times, if the core network device still fails to receive the channel verification response message sent by the user equipment, the core network device deletes the first communication channel and releases the air interface resource occupied by the first communication channel. In addition, the core network device may allocate the air interface resource to the second communication channel directly, thereby further improving air interface resource utilization.

Exemplarily, when the core network device receives a channel establishment request message of the second communication channel, the core network device acquires an IP address of the second communication channel carried in the channel establishment request message. If the IP address is the same as an IP address of the first communication channel, the core network device determines that the second communication channel conflicts with the first communication channel.

It should be noted that, if the second communication channel is a communication channel, which is requested by the user equipment, established between the user equipment and the core network device, the core network device may acquire a device identifier of the user equipment when the core network device receives the channel establishment request message of the user equipment, and may determine that the second communication channel conflicts with the first communication channel when the core network device determines that the user equipment corresponds to both the first communication channel and the second communication channel according to the device identifier. Where a correspondence between the device identifier of the user equipment and a communication channel is stored in the core network device.

According to the foregoing solutions, when it is detected that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

Figure 2:
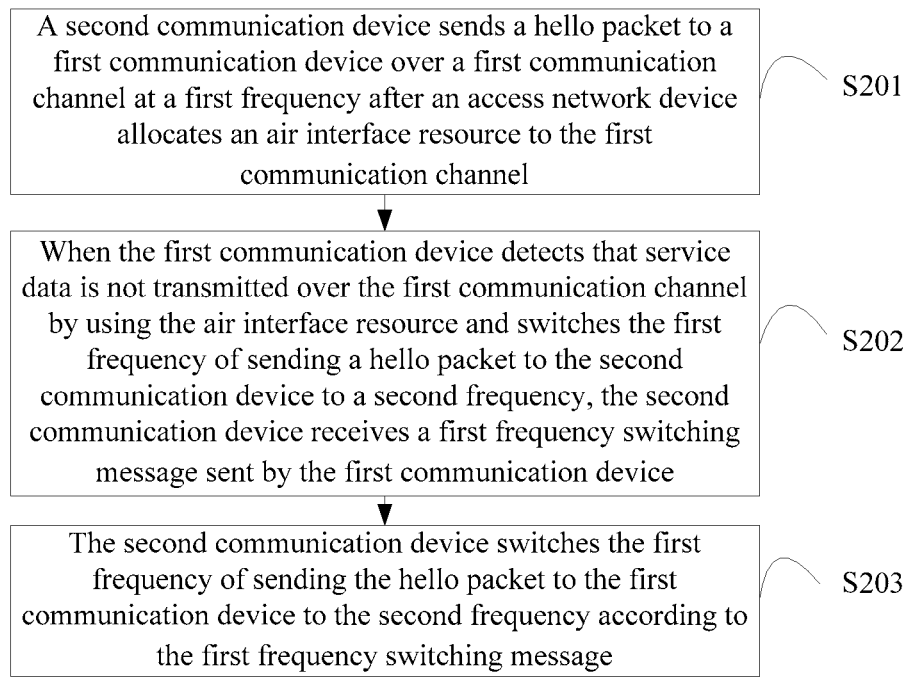
FIG. 2 is a flow diagram of another method for controlling an air interface resource according to an embodiment of the present application.

An embodiment of the present application provides a method for controlling an air interface resource. As shown in FIG. 2, the method includes:

S201. A second communication device sends a hello packet to a first communication device over a first communication channel at a first frequency after an access network device allocates an air interface resource to the first communication channel.

The first communication channel is a communication channel, which passes through the access network device, between the access network device and the second communication device.

In addition, the second communication device is a core network device or user equipment. With reference to the previous embodiment, this embodiment of the present application and the previous embodiment illustrate devices on different sides of the first communication channel, respectively. That is, if the first communication device in the previous embodiment is a core network device, the second communication device in this embodiment of the present application is user equipment; if the first communication device in the previous embodiment is user equipment, the second communication device in this embodiment of the present application is a core network device.

S202. When the first communication device detects that service data is not transmitted over the first communication channel by using the air interface resource and switches the first frequency of sending a hello packet to the second communication device to a second frequency (the second frequency is less than the first frequency), the second communication device receives a first frequency switching message sent by the first communication device.

Specifically, for details about an action of the first communication device in the step S202, refer to a corresponding description of step S103 in the previous embodiment of the present application.

S203. The second communication device switches the first frequency of sending the hello packet to the first communication device to the second frequency according to the first frequency switching message, so as to release the air interface resource occupied by the first communication channel when the access network device fails to receive the hello packet within a packet detection period.

In a possible implementation manner of the present application, both the core network device and the user equipment may detect whether service data is transmitted over the first communication channel by using the air interface resource. Based on a priority principle, when either device detects that the service data is not transmitted over the first communication channel by using the air interface resource first, the device decreases a frequency at which the device sends the hello packet to the peer device and sends a frequency switching message to instruct the peer device also to decrease a frequency of sending a hello packet.

In addition, the first frequency and the second frequency may be pre-configured by a user. It should be noted that, the first frequency should enable the access network device to receive the hello packet within the packet detection period, and the second frequency should enable the access network device to fail to receive the hello packet within the packet detection period. For example, the packet detection period is 20 s, and the first communication device and the second communication device send one hello packet at the first frequency every 10 s; in this case, the access network device is capable of receiving the hello packet within the packet detection period. If the first communication device and the second communication device send one hello packet at the second frequency every 50 s; in this case, the access network device cannot receive the hello packet within the packet detection period. In this way, because the access network device may release the air interface resource occupied by the first communication channel when the hello packet is not received within the packet detection period, the air interface resource may be occupied by another communication channel that needs to transmit service data, thereby improving air interface resource utilization. That is, the first frequency should be greater than a packet detection frequency, and the second frequency should be less than the packet detection frequency, where the packet detection frequency=1/the packet detection period.

Further, after the access network device releases the air interface resource occupied by the first communication channel, when the first communication device detects traffic of the first communication channel and switches the second frequency of sending the hello packet to the second communication device to the first frequency, the second communication device receives a second frequency switching message sent by the first communication device, and switches the second frequency of sending the hello packet to the first communication device to the first frequency according to the second frequency switching message.

Optionally, after the access network device releases the air interface resource occupied by the first communication channel, the second communication device detects the traffic of the first communication channel according to a preset traffic detection period, and switches the second frequency of sending the hello packet to the first communication device to the first frequency when the traffic is detected within the traffic detection period, and then sends a frequency switching message to the first communication device, where the frequency switching message is used for instructing the first communication device to switch the second frequency of sending the hello packet to the second communication device to the first frequency.

Optionally, if the first communication device is a core network device and the second communication device is user equipment, a channel verification message sent by the core network device is received when the core network device receives a request message of establishing a second communication channel and determines that the second communication channel conflicts with the first communication channel, and a channel verification response message is sent to the core network device according to the channel verification message, so that the core network device maintains, according to the channel verification response message, the air interface resource occupied by the first communication channel.

It should be noted that, after retransmitting the channel verification message multiple times, if the core network device still fails to receive the channel verification response message sent by the user equipment, the core network device deletes the first communication channel and releases the air interface resource occupied by the first communication channel. In addition, the core network device may allocate the air interface resource to the second communication channel directly, thereby further improving air interface resource utilization.

According to the foregoing solutions, when it is detected that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

Specifically, the access network device reallocates an air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource. In this way, when detecting the traffic of the first communication channel, the user equipment or the core network device switches the second frequency at which the user equipment or the core network device sends the hello packet the peer device back to the first frequency, and sends a frequency switching message for instructing the peer device to switch the second frequency of sending the hello packet back to the first frequency, thereby ensuring normal use of the first communication channel.

It should be noted that, this embodiment of the present application may be applied in a scenario of hybrid networking of a DSL (digital subscriber line) and LTE. In this scenario, the core network device is an HAAP (hybrid access aggregation point) server, and the user equipment is an HG (home gateway). The HAAP server is deployed with coordination of an HA (hybrid access) to implement that dual tunnels of a DSL and LTE are bound to each home gateway to provide higher bandwidth for a terminal user of the home gateway. In this way, the home gateway or the HAAP server decreases a frequency of sending a hello packet between the home gateway and the HAAP server when determining that service data is not transmitted over the LTE channel by using an air interface resource, so that an eNodeB in the LTE channel releases the air interface resource occupied by the LTE channel when the hello packet is not detected, and the eNodeB may allocate the air interface resource to another channel, thereby improving air interface resource utilization. If the home gateway and the HAAP server determine that service data or a hello packet is transmitted over the LTE channel by using the air interface resource, that is, when the home gateway or the HAAP server detects data traffic or protocol traffic, a frequency at which both devices send hello packets is restored and normal use of the LTE channel is ensured.

In addition, because an LTE channel and a DSL channel exist between a home gateway and an HAAP server in the scenario of hybrid networking of a DSL and LTE, the home gateway and the HAAP server may send a hello packet to the peer device by using the DSL channel. In this way, after the eNodeB releases the air interface resource occupied by the LTE channel, the hello packet between the home gateway and the HAAP server may still be properly sent. In this case, the home gateway and the HAAP need only to detect data traffic used by the LTE channel, and restore a frequency of sending the hello packets by both the devices when it is determined that service data is transmitted over the LTE channel by using the air interface resource.

Figure 3:
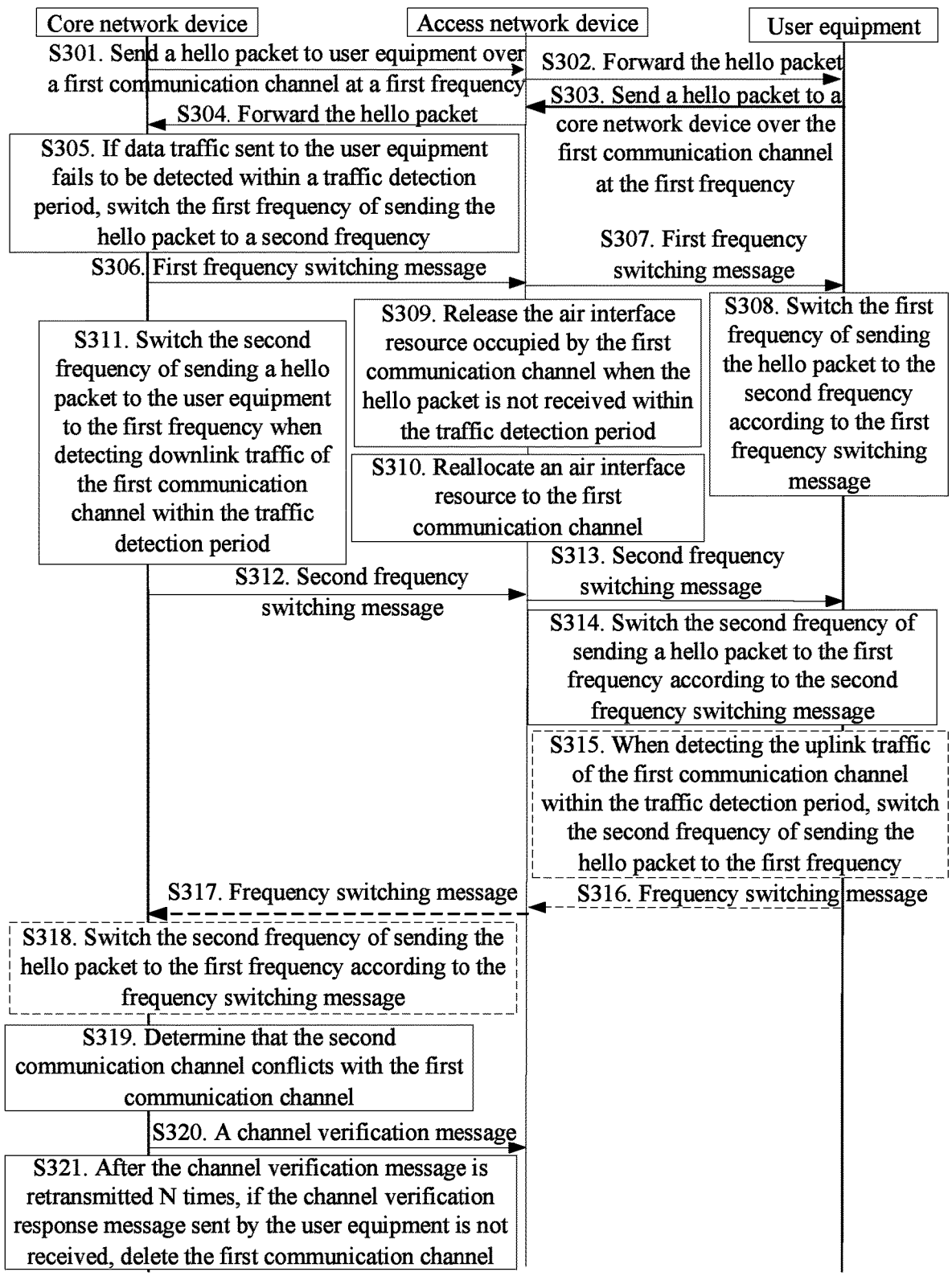
FIG. 3 is a flow diagram of another method for controlling an air interface resource according to an embodiment of the present application.

To make persons skilled in the art more clearly understand technical solutions, provided in the embodiments of the present application, of the method for controlling an air interface resource, the following describes in detail, by using specific embodiments, the method for controlling an air interface resource according to an embodiment of the present application. This embodiment is described by using an example in which a first communication device is a core network device and a second communication device is user equipment. As shown in FIG. 3, the method includes the following steps:

S301. The core network device sends a hello packet to the user equipment over a first communication channel according to a first frequency.

It should be noted that, before step S301, the user equipment sends a channel establishment request message to the access network device, the access network device sends the channel establishment request message to the core network device, and the core network device establishes the first communication channel with respect to the user equipment according to the channel establishment request message and instructs the access network device to allocate an air interface resource to the first communication channel.

In addition, the first communication channel passes through the access network device, that is, the hello packet sent by the core network device to the user equipment needs to be forwarded via the access network device.

S302. An access network device forwards the hello packet to the user equipment when receiving the hello packet over the first communication channel.

It should be noted that, after establishing the first communication channel with the core network device, the user equipment may also send a hello packet to the core network device, where frequencies at which both devices send hello packets needs to be consistent.

S303. The user equipment sends a hello packet to the core network device over the first communication channel at the first frequency.

S304. The access network device forwards the hello packet to the core network device when receiving, over the first communication channel, the hello packet sent by the user equipment to the core network device.

S305. If data traffic sent to the user equipment fails to be detected within a traffic detection period, the core network device switches the first frequency of sending the hello packet to the user equipment to a second frequency.

The traffic detection period may be preset by a user, and is related to a time allowed for which no service data is carried on the air interface resource. For example, if it is expected that the access network device releases the air interface resource when no service data is carried on the air interface resource for 10 minutes, the traffic detection period may be preset as 10 minutes.

S306. The core network device sends a first frequency switching message to the user equipment over the first communication channel.

S307. The access network device sends the first frequency switching message to the user equipment when receiving the first frequency switching message over the first communication channel.

S308. The user equipment switches the first frequency of sending the hello packet to the core network device to the second frequency according to the first frequency switching message, where the second frequency is less than the first frequency.

It should be noted that, the first frequency and the second frequency may be preset by a user, and may be specific frequency values or may be frequency ranges, which are not limited in the present application.

In addition, because the access network device releases the air interface resource occupied by the communication channel when a hello packet is not received over the communication channel within the packet detection period, setting of the first frequency and the second frequency is related to the packet detection period. For example, the packet detection period is 20 s, and the core network device and the user equipment send one hello packet at the first frequency every 10 s; in this case, the access network device is capable of receiving the hello packet within the packet detection period. If the core network device and the user equipment send one hello packet at the second frequency every 50 s; in this case, the access network device cannot receive the hello packet within the packet detection period. In this way, because the access network device may release the air interface resource occupied by the first communication channel when the hello packet is not received within the packet detection period, the air interface resource may be occupied by another communication channel that needs to transmit service data, thereby improving air interface resource utilization. That is, the first frequency should be greater than a packet detection frequency, and the second frequency should be less than the packet detection frequency, where the packet detection frequency=1/the packet detection period.

S309. The access network device releases the air interface resource occupied by the first communication channel when the hello packet is not received within the traffic detection period.

S310. The access network device reallocates an air interface resource to the first communication channel.

Specifically, the access network device reallocates the air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource.

S311. The core network device switches the second frequency of sending a hello packet to the user equipment to the first frequency when detecting downlink traffic of the first communication channel within the traffic detection period.

S312. The core network device sends a second frequency switching message to the user equipment over the first communication channel.

S313. The access network device sends the second frequency switching message to the user equipment when receiving the second frequency switching message over the first communication channel.

S314. The user equipment switches the second frequency of sending a hello packet to the core network device to the first frequency according to the second frequency switching message.

It should be noted that, alternatively, the user equipment may initiate, by detecting uplink traffic of the first communication channel, switching of a frequency of sending the hello packet. Therefore, optionally, based on a priority principle, when the user equipment first detects the uplink traffic of the first communication channel, step S315 to step S318 are performed.

S315. When detecting uplink traffic of the first communication channel within the traffic detection period, the user equipment switches the second frequency of sending the hello packet to the core network device to the first frequency.

S316. The user equipment sends a frequency switching message to the core network device over the first communication channel.

S317. The access network device sends the frequency switching message to the core network device when receiving the frequency switching message over the first communication channel.

S318. The core network device switches the second frequency of sending the hello packet to the user equipment to the first frequency according to the frequency switching message.

In this way, when it is detected that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

Optionally, based on step S319 to step S321, air interface resource utilization may be further improved.

S319. The core network device determines that the second communication channel conflicts with the first communication channel when receiving a request message of establishing a second communication channel.

The request message may be sent by the user equipment or another user equipment to the core network device.

Exemplarily, when receiving a channel establishment request message with respect to the second communication channel, the core network device acquires an IP address of the second communication channel carried in the channel establishment request message. If the IP address is the same as an IP address of the first communication channel, the core network device determines that the second communication channel conflicts with the first communication channel.

It should be noted that, if the second communication channel is a communication channel, which is requested by the user equipment, established between the user equipment and the core network device, the core network device may acquire a device identifier of the user equipment when receiving the channel establishment request message of the user equipment, and then may determine that the second communication channel conflicts with the first communication channel when determining that the user equipment corresponds to both the first communication channel and the second communication channel according to the device identifier, where a correspondence between the device identifier of the user equipment and a communication channel is stored in the core network device.

S320. The core network device sends a channel verification message to the user equipment over the first communication channel.

S321. After retransmitting the channel verification message to the user equipment N times, if the core network device fails to receive a channel verification response message sent by the user equipment, the core network device deletes the first communication channel.

It should be noted that, in the prior art, if user equipment is powered off or restarts, a core network device may not be sensed immediately. In this case, a first communication channel between the user equipment and the core network device may still be maintained until a hello packet expires. In this way, if it is detected that a time after the hello packet expires is too long, waste of the air interface resource occupied by the first communication channel may be caused. Meanwhile, when the core network device receives a request message of establishing a second communication channel sent by the user equipment or another user equipment, if the second communication channel requested by the request message conflicts with the first communication channel, the second communication channel cannot be established. In this embodiment of the present application, when determining that the second communication channel conflicts with the first communication channel, the core network device sends a channel verification message to the user equipment over the first communication channel to verify whether the first communication channel is properly used. After retransmitting the channel verification message multiple times, if the core network device still fails to receive the channel verification response message sent by the user equipment, the core network device instructs the access network device to delete the first communication channel and release the air interface resource occupied by the first communication channel. In addition, the core network device may allocate the air interface resource to the second communication channel directly, thereby further improving air interface resource utilization.

Moreover, for brief description, the foregoing method embodiments are represented as a series of actions. However, persons skilled in the art should understand that the present application is not limited to the described order of the actions. In addition, persons skilled in the art should also understand that the embodiments described herein are exemplary embodiments, and the involved actions and modules mentioned are not necessarily required by the present application.

Specifically, the access network device reallocates an air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource. In this way, when detecting the traffic of the first communication channel, the user equipment or the core network device switches the second frequency at which the user equipment or the core network device sends the hello packet the peer device back to the first frequency, and sends a frequency switching message for instructing the peer device to switch the second frequency of sending the hello packet back to the first frequency, thereby ensuring normal use of the first communication channel.

It should be noted that, this embodiment of the present application may be applied in a scenario of hybrid networking of a DSL (digital subscriber line) and LTE. In this scenario, the core network device is an HAAP (hybrid access aggregation point) server, and the user equipment is an HG (home gateway). The HAAP server is deployed with coordination of an HA (hybrid access) to implement that dual tunnels of a DSL and LTE are bound to each home gateway to provide higher bandwidth for a terminal user of the home gateway. In this way, the home gateway or the HAAP server decreases a frequency of sending a hello packet between the home gateway and the HAAP server when determining that service data is not transmitted over the LTE channel by using an air interface resource, so that an eNodeB in the LTE channel releases the air interface resource occupied by the LTE channel when the hello packet is not detected, and the eNodeB may allocate the air interface resource to another channel, thereby improving air interface resource utilization. If the home gateway and the HAAP server determine that service data or a hello packet is transmitted over the LTE channel by using the air interface resource, that is, when the home gateway or the HAAP server detects data traffic or protocol traffic, a frequency at which both devices send hello packets is restored and normal use of the LTE channel is ensured.

In addition, because an LTE channel and a DSL channel exist between a home gateway and an HAAP server in the scenario of hybrid networking of a DSL and LTE, the home gateway and the HAAP server may send a hello packet to the peer device by using the DSL channel. In this way, after the eNodeB releases the air interface resource occupied by the LTE channel, the hello packet between the home gateway and the HAAP server may still be properly sent. In this case, the home gateway and the HAAP need only to detect data traffic used by the LTE channel, and restore a frequency of sending the hello packets by both the devices when it is determined that service data is transmitted over the LTE channel by using the air interface resource.

Figure 4:
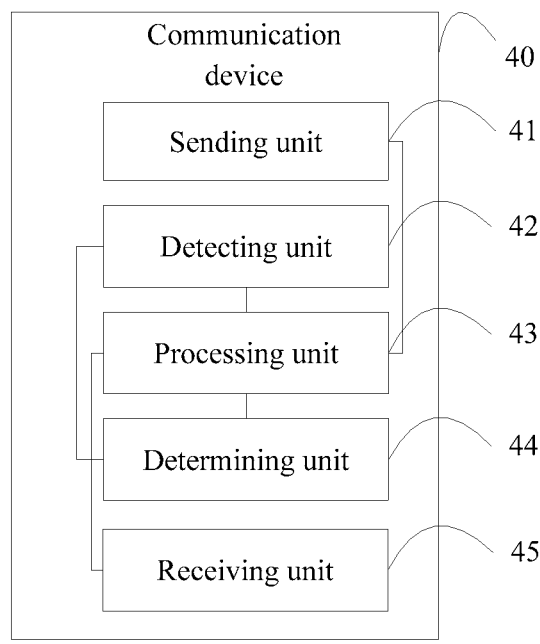
FIG. 4 is a schematic structural diagram of a communication device according to an embodiment of the present application.

An embodiment of the present application provides a communication device 40, corresponding to the foregoing method embodiment of FIG. 1, all functional units of the communication device 40 may be used in the foregoing method steps. As shown in FIG. 4, the communication device 40 includes:

a sending unit 41, configured to send a hello packet to a second communication device over a first communication channel at a first frequency after an access network device allocates an air interface resource to the first communication channel, where the first communication channel is a communication channel, which passes through the access network device, between the communication device and the second communication device, and the communication device is a core network device or user equipment;

a detecting unit 42, configured to detect whether service data is transmitted over the first communication channel by using the air interface resource; and a processing unit 43, configured to switch, when the detecting unit 42 detects that the service data is not transmitted over the first communication channel by using the air interface resource, the first frequency at which the sending unit 41 sends the hello packet to the second communication device to a second frequency; where the sending unit 41 is further configured to send a first frequency switching message to the second communication device, where the first frequency switching message is used for instructing the second communication device to switch the first frequency of sending a hello packet to the communication device to the second frequency.

The first frequency and the second frequency may be pre-configured by a user. It should be noted that, the first frequency should enable the access network device to receive the hello packet within the packet detection period, and the second frequency should enable the access network device to fail to receive the hello packet within the packet detection period. For example, the packet detection period is 20 s, and the communication device and the second communication device send one hello packet at the first frequency every 10 s; in this case, the access network device is capable of receiving the hello packet within the packet detection period. If the communication device and the second communication device send one hello packet at the second frequency every 50 s; in this case, the access network device cannot receive the hello packet within the packet detection period. In this way, because the access network device may release the air interface resource occupied by the first communication channel when the hello packet is not received within the packet detection period, the air interface resource may be occupied by another communication channel that needs to transmit service data, thereby improving air interface resource utilization. That is, the first frequency should be greater than a packet detection frequency, and the second frequency should be less than the packet detection frequency, where the packet detection frequency=1/the packet detection period.

Optionally, the detecting unit 42 is specifically configured to detect traffic of the first communication channel according to a preset traffic detection period; the communication device further includes a determining unit 44, configured to determine, when the traffic of the first communication channel is not detected by the detecting unit 42, that the service data is not transmitted over the first communication channel by using the air interface resource.

Exemplarily, if the communication device is a core network device and the second communication device is user equipment, the core network device may detect, according to a preset traffic detection period, whether downlink data traffic that is sent to the user equipment over the first communication channel exists. If the downlink data traffic that is sent to the user equipment over the first communication channel do not exist within the preset traffic detection period, then it may be determined that the user equipment does not perform any data service. Therefore, the communication device may determine that service data is not transmitted over the first communication channel by using the air interface resource. If the communication device is user equipment and the second communication device is a core network device, the user equipment may detect, according to a preset traffic detection period, whether data traffic, including uplink data traffic, is used by the user equipment. When use of the data traffic is not detected within the traffic detection period, it is determined that the service data is not transmitted over the first communication channel by using the air interface resource.

Optionally, the detecting unit 42 is further configured to detect the traffic of the first communication channel within the traffic detection period after the access network device releases the air interface resource occupied by the first communication channel; the processing unit 43 is further configured to switch the second frequency of sending the hello packet to the second communication device to the first frequency; the sending unit 41 is further configured to send a second frequency switching message to the second communication device, where the second frequency switching message is used for instructing the second communication device to switch the second frequency of sending the hello packet to the communication device to the first frequency.

Optionally, the communication device further includes a receiving unit 45, configured to receive a frequency switching message sent by the second communication device if the second communication device detects the traffic of the first communication channel and switches the second frequency of sending the hello packet to the communication device to the first frequency after the access network device releases the air interface resource occupied by the first communication channel; the processing unit 43 is further configured to switch, according to the frequency switching message, the second frequency of sending the hello packet to the second communication device to the first frequency.

Specifically, the access network device reallocates an air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource. In this way, when detecting the traffic of the communication device, the user equipment or the core network device switches the second frequency at which the user equipment or the core network device sends the hello packet the peer device back to the first frequency, and sends a frequency switching message for instructing the peer device to switch the second frequency of sending the hello packet back to the first frequency, thereby ensuring normal use of the first communication channel.

Optionally, if the communication device is a core network device and the second communication device is user equipment, the receiving unit 45 is configured to receive a request message of establishing a second communication channel; the determining unit 44 is configured to determine, according to the request message, that the second communication channel conflicts with the first communication channel; the sending unit 41 is further configured to, send a channel verification message to the user equipment over the first communication channel, and retransmit the channel verification message to the user equipment over the first communication channel if a channel verification response message sent by the user equipment is not received; the processing unit 43 is further configured to delete the first communication channel if the channel verification response message sent by the user equipment is not received after a channel verification response is retransmitted to the user equipment N times, where the N is a natural number.

According to the foregoing communication device, when the communication device detects that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

Figure 5:
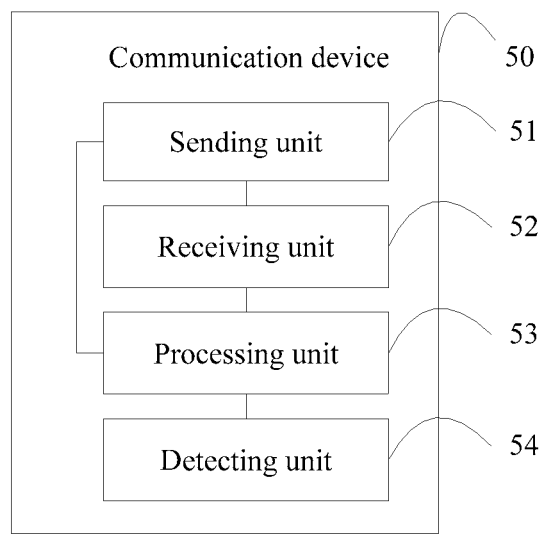
FIG. 5 is a schematic structural diagram of another communication device according to an embodiment of the present application.

An embodiment of the present application provides a communication device 50, corresponding to the foregoing method embodiment of FIG. 2, all functional units of the communication device 50 may be used in the foregoing method steps. As shown in FIG. 5, the communication device 50 includes:

a sending unit 51, configured to send a hello packet to a first communication device over a first communication channel at a first frequency after an access network device allocates an air interface resource to the first communication channel, where the first communication channel is a communication channel, which passes through the access network device, between the first communication device and the communication device, and the communication device is a core network device or user equipment;

a receiving unit 52, configured to receive a first frequency switching message sent by the first communication device when the first communication device detects that service data is not transmitted over the first communication channel by using the air interface resource and switches the first frequency of sending a hello packet to the communication device to a second frequency; and a processing unit 53, configured to switch, according to the first frequency switching message, the first frequency of sending the hello packet to the first communication device to the second frequency.

The first frequency and the second frequency may be pre-configured by a user. It should be noted that, the first frequency should enable the access network device to receive the hello packet within the packet detection period, and the second frequency should enable the access network device to fail to receive the hello packet within the packet detection period. For example, the packet detection period is 20 s, and the first communication device and the second communication device send one hello packet at the first frequency every 10 s; in this case, the access network device is capable of receiving the hello packet within the packet detection period. If the first communication device and the second communication device send one hello packet at the second frequency every 50 s; in this case, the access network device cannot receive the hello packet within the packet detection period. In this way, because the access network device may release the air interface resource occupied by the first communication channel when the hello packet is not received within the packet detection period, the air interface resource may be occupied by another communication channel that needs to transmit service data, thereby improving air interface resource utilization. That is, the first frequency should be greater than a packet detection frequency, and the second frequency should be less than the packet detection frequency, where the packet detection frequency=1/the packet detection period.

Optionally, the receiving unit 52 is further configured to receive a second frequency switching message sent by the first communication device when the first communication device detects traffic of the first communication channel and switches the second frequency of sending the hello packet to the communication device to the first frequency after the access network device releases the air interface resource occupied by the first communication channel; the processing unit 53 is further configured to switch the second frequency of sending the hello packet to the first communication device to the first frequency according to the second frequency switching message.

Optionally, the communication device further includes a detecting unit 54, configured to detect traffic of the first communication channel according to a preset traffic detection period after the access network device releases the air interface resource occupied by the first communication channel; the processing unit 53 is further configured to switch the second frequency of sending the hello packet to the first communication device to the first frequency; the sending unit 51 is further configured to send a frequency switching message to the first communication device, where the frequency switching message is used for instructing the first communication device to switch the second frequency of sending the hello packet to the communication device to the first frequency.

Specifically, the access network device reallocates an air interface resource to the first communication channel when sensing uplink traffic of the user equipment or downlink traffic of the core network device, where the traffic includes data traffic or protocol traffic, so that a hello packet or service data is transmitted over the first communication channel by using the air interface resource. In this way, when detecting the traffic of the first communication channel, the user equipment or the core network device switches the second frequency at which the user equipment or the core network device sends the hello packet the peer device back to the first frequency, and sends a frequency switching message for instructing the peer device to switch the second frequency of sending the hello packet back to the first frequency, thereby ensuring normal use of the first communication channel.

Optionally, if the first communication device is a core network device and the communication device is user equipment, the receiving unit 52 is further configured to receive a channel verification message sent by the core network device when the core network device receives a request message of establishing a second communication channel and determines that the second communication channel conflicts with the first communication channel; the sending unit 51 is further configured to send, according to the channel verification message, a channel verification response message to the core network device, so that the core network device maintains, according to the channel verification response message, the air interface resource occupied by the first communication channel.

According to the foregoing communication device, the communication device receives the frequency switching message sent by the first communication device when the first communication device corresponding to the communication device detects that service data is not transmitted over a communication channel between both the devices by using an air interface resource and switches the first frequency of sending the hello packet over the communication channel to the second frequency, and a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

Figure 6:
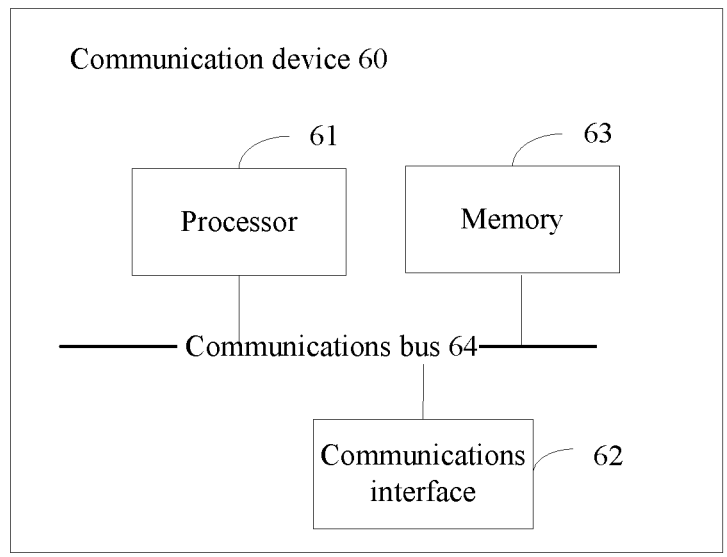
FIG. 6 is a schematic structural diagram of another communication device according to an embodiment of the present application.

An embodiment of the present application provides a communication device 60, and the communication device 60 is a core network device or user equipment. As shown in FIG. 6, the communication device 60 includes:

a processor 61, a communications interface 62, a memory 63 and a communications bus 64, where the processor 61, the communications interface 62 and the memory 63 complete communication with each other through the communications bus 64.

The processor 61 may be a multi-core central processing unit (CPU), or an application specific integrated circuit ASIC (Application Specific Integrated Circuit), or configured to be one or multiple integrated circuits that implement this embodiment of the present application.

The memory 63 is configured to store program code, where the program code includes a computer operation instruction and a network flow graph. The memory 63 may include a high speed random access memory (RAM), and may also include a non-volatile memory, for example, at least one disk memory.

The communications interface 62 is configured to implement connection and communication between these apparatuses.

The processor 61 is configured to execute the program code in the memory 63 to perform the following operations:

sending a hello packet to a second communication device over a first communication channel at a first frequency after an access network device allocates an air interface resource to the first communication channel, where the first communication channel is a communication channel, which passes through the access network device, between the communication device 60 and the second communication device, and the communication device 60 is a core network device or user equipment;

detecting, by the communication device 60, whether service data is transmitted over the first communication channel by using the air interface resource;

switching, when it is detected that the service data is not transmitted over the first communication channel by using the air interface resource, the first frequency of sending the hello packet to the second communication device to a second frequency; and sending a first frequency switching message to the second communication device, where the first frequency switching message is used for instructing the second communication device to switch the first frequency of sending a hello packet to the communication device to the second frequency.

Optionally, the detecting, by the communication device, whether service data is transmitted over the first communication channel by using the air interface resource includes:

detecting data traffic of the first communication channel according to a preset traffic detection period; and determining, when the data traffic of the first communication channel is not detected within the traffic detection period, that the service data is not transmitted over the first communication channel by using the air interface resource.

Optionally, the operations further include:

switching, when the traffic of the first communication channel is detected within the traffic detection period, the second frequency of sending the hello packet to the second communication device to the first frequency; and sending a second frequency switching message to the second communication device, where the second frequency switching message is used for instructing the second communication device to switch the second frequency of sending the hello packet to the communication device to the first frequency.

Optionally, the operations further include:

receiving a frequency switching message sent by the second communication device when the second communication device detects the traffic of the first communication channel and switches the second frequency of sending the hello packet to the communication device to the first frequency; and switching, according to the frequency switching message, the second frequency of sending the hello packet to the second communication device to the first frequency.

Optionally, if the communication device is a core network device and the second communication device is user equipment, the operations further include: sending a channel verification message to the user equipment over the first communication channel when the core network device receives a request message of establishing a second communication channel and determines that the second communication channel conflicts with the first communication channel;

retransmitting, when the core network device fails to receive a channel verification response message sent by the user equipment, the channel verification message to the user equipment over the first communication channel; and deleting the first communication channel if the core network device fails to receive the channel verification response message sent by the user equipment after retransmitting the channel verification message to the user equipment N times, where the N is a natural number.

Persons skilled in the art may clearly understand that for ease and brevity of description, the foregoing division of function modules is used only as an example. In practical application, the foregoing functions may be undertaken by different function modules as required, that is, the internal structure of an apparatus is divided into different function modules to implement all or a part of the functions described above. For a detailed working process of the foregoing system, apparatus, and unit, refer to a corresponding process in the foregoing method embodiments, and details are not described herein.

Figure 7:
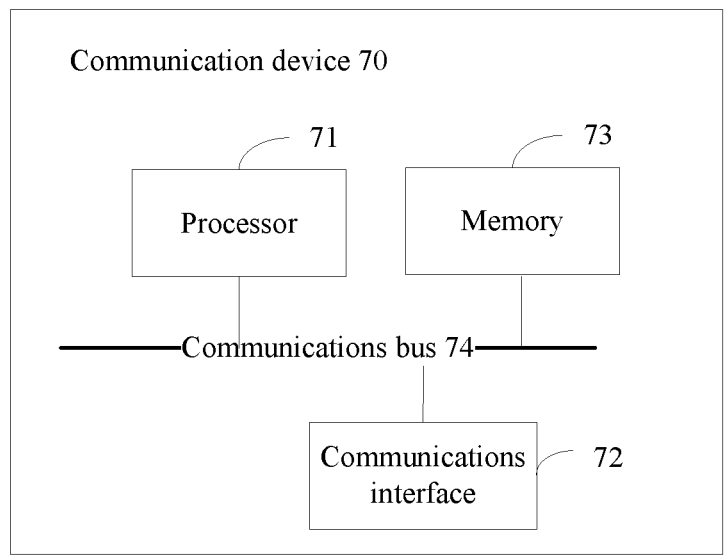
FIG. 7 is a schematic structural diagram of another communication device according to an embodiment of the present application.

An embodiment of the present application provides a communication device 70, and the communication device 70 is a core network device or user equipment. As shown in FIG. 7, the communication device 70 includes:

a processor 71, a communications interface 72, a memory 73 and a communications bus 74, where the processor 71, the communications interface 72 and the memory 73 complete communication with each other through the communications bus 74.

The processor 71 may be a multi-core central processing unit (CPU), or an application specific integrated circuit ASIC (Application Specific Integrated Circuit), or configured to be one or multiple integrated circuits that implement this embodiment of the present application.

The memory 73 is configured to store program code, where the program code includes a computer operation instruction and a network flow graph. The memory 73 may include a high speed RAM memory, and may also include a non-volatile memory, for example, at least one disk memory.

The communications interface 72 is configured to implement connection and communication between these apparatuses.

The processor 71 is configured to execute the program code in the memory 73 to perform the following operations:

sending, by the communication device 70, a hello packet to a first communication device over a first communication channel at a first frequency after an access network device allocates an air interface resource to the first communication channel, where the first communication channel is a communication channel, which passes through the access network device, between the first communication device and the communication device 70, and the communication device 70 is a core network device or user equipment;

receiving a first frequency switching message sent by the first communication device when the first communication device detects that service data is not transmitted over the first communication channel by using the air interface resource and switches the first frequency of sending a hello packet to the communication device to a second frequency; and switching, according to the first frequency switching message, the first frequency of sending the hello packet to the first communication device to the second frequency.

Optionally, the operations further include:

receiving, when the first communication device detects traffic of the first communication channel and switches the second frequency of sending the hello packet to the communication device to the first frequency, a second frequency switching message sent by the first communication device; and switching, according to the second frequency switching message, the second frequency of sending the hello packet to the first communication device to the first frequency.

Optionally, the operations further include:

switching, when traffic of the first communication channel is detected according to a preset traffic detection period, the second frequency of sending the hello packet to the first communication device to the first frequency; and sending a frequency switching message to the first communication device, where the frequency switching message is used for instructing the first communication device to switch the second frequency of sending the hello packet to the communication device to the first frequency.

Optionally, if the first communication device is a core network device and the communication device is user equipment, the operations further include:

receiving a channel verification message sent by the core network device when the core network device receives a request message of establishing a second communication channel and determines that the second communication channel conflicts with the first communication channel; and sending, according to the channel verification message, a channel verification response message to the core network device, so that the core network device maintains, according to the channel verification response message, the air interface resource occupied by the first communication channel.

Persons skilled in the art may clearly understand that for ease and brevity of description, the foregoing division of function modules is used only as an example. In practical application, the foregoing functions may be undertaken by different function modules as required, that is, the internal structure of an apparatus is divided into different function modules to implement all or a part of the functions described above. For a detailed working process of the foregoing system, apparatus, and unit, refer to a corresponding process in the foregoing method embodiments, and details are not described herein.

Figure 8:
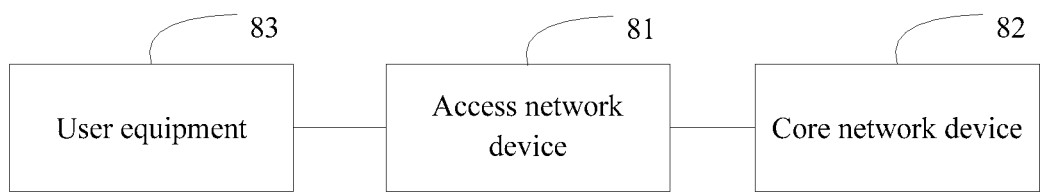
FIG. 8 is a schematic structural diagram of an air interface resource control system according to an embodiment of the present application.

An embodiment of the present application provides an air interface resource control system. As shown in FIG. 8, the air interface resource control system includes an access network device 81, the air interface resource control system further includes: a core network device 82 and a user equipment 83, where the user equipment 83 is connected to the access network device 81, and the access network device 81 is connected to the core network device 82.

The access network device is configured to allocate an air interface resource for a communication channel between the core network device 82 and the user equipment 83.

The core network device 82 is a communication device 40/communication device 60 as shown in FIG. 4/FIG. 6, and for specific description, refer to the corresponding description of FIG. 4/FIG. 6, which is not described herein. In this case, the user equipment 83 is a communication device 50/communication device 70 as shown in FIG. 5/FIG. 7, and for specific description, refer to the corresponding description of FIG. 5/FIG. 7, which is not described herein. Alternatively:

The core network device 82 is a communication device 50/communication device 70 as shown in FIG. 5/FIG. 7, and for specific description, refer to the corresponding description of FIG. 5/FIG. 7, which is not described herein. In this case, the user equipment 83 is a communication device 40/communication device 60 as shown in FIG. 4/FIG. 6, and for specific description, refer to the corresponding description of FIG. 4/FIG. 6, which is not described herein.

According to the foregoing air interface resource control system, when it is detected that service data is not transmitted, by using an air interface resource, over a communication channel that occupies the air interface resource, a frequency at which communication devices at both ends of the communication channel send a hello packet is decreased, so that an access network device cannot detect the hello packet within a packet detection period. In this way, the access network device releases the air interface resource when the hello packet is not detected within the packet detection period, so that the access network device may allocate the air interface resource to another communication channel, thereby improving air interface resource utilization.

The foregoing descriptions are merely specific embodiments of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

Additionally, statements made herein characterizing the invention refer to an embodiment of the invention and not necessarily all embodiments.

What is claimed is:

1. A method, comprising:
sending, by a first communication device, hello packets at a first frequency to a second communication device over a first communication channel, wherein the first communication channel is a communication channel between the first communication device and the second communication device, and wherein the first communication channel is based on an air interface resource;
in response to traffic not passing over the first communication channel for a predetermined amount of time, sending, by the first communication device, hello packets at a second frequency to the second communication device over the first communication channel, wherein sending hello packets at the second frequency corresponds to sending hello packets less frequently than sending hello packets at the first frequency, wherein the first frequency is higher than a packet detection frequency, wherein the second frequency is lower than the packet detection frequency, wherein the packet detection frequency is the reciprocal of a packet detection period, and wherein the air interface resource is released based on a hello packet not being transmitted over the first communication channel during the packet detection period; and
sending, by the first communication device, a first message to the second communication device for instructing the second communication device to send hello packets at the second frequency.

2. The method according to claim 1, further comprising:
based on traffic of the first communication channel being detected within a preset traffic detection period, switching, by the first communication device, from sending hello packets at the second frequency to sending hello packets at the first frequency; and
sending, by the first communication device, a second message to the second communication device for instructing the second communication device to switch from sending hello packets at the second frequency to sending hello packets at the first frequency.

3. The method according to claim 1, further comprising:
receiving, by the first communication device, a message from the second communication device; and
switching, by the first communication device, according to the message, from sending hello packets at the second frequency to sending hello packets at the first frequency.

4. The method according to claim 1, wherein the first communication device is a core network device and the second communication device is a user equipment, and wherein the method further comprises:
sending, by the core network device, a channel verification message to the user equipment over the first communication channel based on the core network device receiving a request message for establishing a second communication channel between the core network device and the user equipment and the second communication channel conflicting with the first communication channel;
retransmitting, by the core network device, based on the core network device failing to receive a channel verification response message from the user equipment, the channel verification message to the user equipment over the first communication channel; and
deleting, by the core network device, the first communication channel based on the core network device failing to receive the channel verification response message from the user equipment after retransmitting the channel verification message to the user equipment N times, wherein N is a natural number.

5. The method according to claim 1, wherein the traffic comprises data traffic or protocol traffic.

6. The method according to claim 1, wherein the first frequency is preconfigured by a user.

7. The method according to claim 1, wherein the first communication channel passes through an access network device, and wherein the air interface resource is allocated by the access network device.

8. The method according to claim 1, wherein the first communication device is a home gateway (HG) and the second communication device is a hybrid access aggregation point (HAAP) server;
wherein the first communication channel is a wireless communication channel between the HG and the HAAP server; and
wherein after releasing the air interface resource, hello packets are transmitted between the HG and the HAAP server through a second communication channel between the HG and the HAAP server.

9. A first communication device, wherein the first communication device comprises a processor and a memory, wherein the memory is configured to store program code, and wherein the processor is configured to execute the program code in the memory to facilitate the following operations:
sending hello packets at a first frequency to a second communication device over a first communication channel, wherein the first communication channel is a communication channel between the first communication device and the second communication device, and wherein the first communication channel is based on an air interface resource;
in response to traffic not passing over the first communication channel for a predetermined amount of time, sending hello packets at a second frequency to the second communication device over the first communication channel, wherein sending hello packets at the second frequency corresponds to sending hello packets less frequently than sending hello packets at the first frequency, wherein the first frequency is higher than a packet detection frequency, wherein the second frequency is lower than the packet detection frequency, wherein the packet detection frequency is the reciprocal of a packet detection period, and wherein the air interface resource is released based on a hello packet not being transmitted over the first communication channel during the packet detection period; and
sending a first message to the second communication device for instructing the second communication device to send hello packets at the second frequency.

10. The first communication device according to claim 9, wherein the processor is further configured to execute the program code in the memory to facilitate:
based on traffic of the first communication channel being detected within a preset traffic detection period, switching from sending hello packets at the second frequency to sending hello packets at the first frequency; and sending a second message to the second communication device for instructing the second communication device to switch from sending hello packets over the first communication channel at the second frequency to sending hello packets over the first communication channel at the first frequency.

11. The first communication device according to claim 9, wherein the processor is further configured to execute the program code in the memory to facilitate:
receiving a message from the second communication device; and
switching, according to the message, from sending hello packets at the second frequency to sending hello packets at the first frequency.

12. The first communication device according to claim 9, wherein the first communication device is a core network device and the second communication device is a user equipment, and wherein the processor is further configured to execute the program code in the memory to facilitate:
sending a channel verification message to the user equipment over the first communication channel based on the core network device receiving a request message for establishing a second communication channel between the core network device and the user equipment and the second communication channel conflicting with the first communication channel;
retransmitting, based on the core network device failing to receive a channel verification response message from the user equipment, the channel verification message to the user equipment over the first communication channel; and
deleting the first communication channel based on the core network device failing to receive the channel verification response message from the user equipment after retransmitting the channel verification message to the user equipment N times, wherein N is a natural number.

13. The first communication device according to claim 9, wherein the traffic comprises data traffic or protocol traffic.

14. A second communication device, wherein the second communication device comprises a processor and a memory, wherein the memory is configured to store program code, and wherein the processor is configured to execute the program code in the memory to facilitate the following operations:
sending hello packets to a first communication device over a first communication channel at a first frequency, wherein the first communication channel is a communication channel between the first communication device and the second communication device, and wherein the first communication channel is based on an air interface resource;
receiving a first message from the first communication device, wherein the first message corresponds to traffic not passing over the first communication channel for a predetermined amount of time; and
switching, according to the first message, from sending hello packets to the first communication device over the first communication channel at the first frequency to sending hello packets to the first communication device over the first communication channel at a second frequency, wherein sending hello packets at the second frequency corresponds to sending hello packets less frequently than sending hello packets at the first frequency, wherein the first frequency is higher than a packet detection frequency, wherein the second frequency is lower than the packet detection frequency, wherein the packet detection frequency is the reciprocal of a packet detection period, and wherein the air interface resource is released based on a hello packet not being transmitted over the first communication channel during the packet detection period.

15. The second communication device according to claim 14, wherein the processor is further configured to execute the program code in the memory to facilitate:
receiving a second message from the first communication device; and
switching, according to the second message, from sending hello packets over the first communication channel at the second frequency to sending hello packets over the first communication channel at the first frequency.

16. The second communication device according to claim 14, wherein the processor is further configured to execute the program code in the memory to facilitate:
based on traffic of the first communication channel being detected according to a preset traffic detection period, switching from sending hello packets over the first communication channel at the second frequency to sending hello packets over the first communication channel at the first frequency; and
sending a message to the first communication device for instructing the first communication device to switch from sending hello packets over the first communication channel at the second frequency to sending hello packets over the first communication channel at the first frequency.

17. The second communication device according to claim 14, wherein the first communication device is a core network device and the second communication device is a user equipment, and wherein the processor is further configured to execute the program code in the memory to facilitate:
receiving a channel verification message from the core network device, wherein the channel verification message corresponds to the core network device receiving a request message for establishing a second communication channel between the core network device and the user equipment and the second communication channel conflicts with the first communication channel; and
sending, according to the channel verification message, a channel verification response message to the core network device.

18. The second communication device according to claim 14, wherein the traffic comprises data traffic or protocol traffic.

19. A system, comprising:
a first communication device; and
a second communication device;
where the first communication device is configured to:
send hello packets at a first frequency to the second communication device over a first communication channel between the first communication device and the second communication device, wherein the first communication channel is based on an air interface resource;
in response to traffic not passing over the first communication channel for a predetermined amount of time, send hello packets at a second frequency to the second communication device over the first communication channel, wherein sending hello packets at the second frequency corresponds to sending hello packets less frequently than sending hello packets at the first frequency, wherein the first frequency is higher than a packet detection frequency, wherein the second frequency is lower than the packet detection frequency, wherein the packet detection frequency is the reciprocal of a packet detection period, and wherein the air interface resource is released based on a hello packet not being transmitted over the first communication channel during the packet detection period; and send a first message to the second communication device for instructing the second communication device to send hello packets at the second frequency.

20. The system according to claim 19, wherein the traffic comprises data traffic or protocol traffic.

21. The system according to claim 19, wherein the first communication device is a home gateway (HG) and the second communication device is a hybrid access aggregation point (HAAP) server;

wherein the first communication channel is a wireless communication channel between the HG and the HAAP server; and wherein the HG and the HAAP server are configured to transmit hello packets between the HG and the HAAP server through a second communication channel between the HG and the HAAP server after the air interface resource is released.

22. The system according to claim 21, wherein the second communication channel is a digital subscriber line (DSL) channel.

* * * * *